(12) United States Patent
Hofmann et al.

(10) Patent No.: US 8,736,219 B2
(45) Date of Patent: May 27, 2014

(54) INDUSTRIAL ROBOT HAVING REDUNDANT EMERGENCY BRAKE CIRCUIT

(75) Inventors: Josef Hofmann, Wolferstadt (DE); Richard Schwarz, Friedberg (DE); Sönke Marx, Augsburg (DE)

(73) Assignee: KUKA Laboratories GmbH, Augsburg (DE)

( * ) Notice: Subject to any disclaimer, the term of this patent is extended or adjusted under 35 U.S.C. 154(b) by 802 days.

(21) Appl. No.: 12/747,733

(22) PCT Filed: Oct. 29, 2008
(Under 37 CFR 1.47)

(86) PCT No.: PCT/EP2008/064625
§ 371 (c)(1),
(2), (4) Date: Jul. 19, 2010

(87) PCT Pub. No.: WO2009/074396
PCT Pub. Date: Jun. 18, 2009

(65) Prior Publication Data
US 2010/0288067 A1 Nov. 18, 2010

(30) Foreign Application Priority Data

Dec. 11, 2007 (DE) .......................... 10 2007 059 492

(51) Int. Cl.
| *H02P 27/00* | (2006.01) |
| *H02P 3/00* | (2006.01) |
| *H02P 3/12* | (2006.01) |
| *H02M 5/40* | (2006.01) |
| *H02J 3/36* | (2006.01) |

(52) U.S. Cl.
USPC ........... 318/801; 318/375; 318/379; 318/380; 363/34; 363/35

(58) Field of Classification Search
USPC ............... 318/375, 379, 380, 801; 363/34, 35
See application file for complete search history.

(56) References Cited

U.S. PATENT DOCUMENTS

| 5,012,169 A * | 4/1991 | Ono et al. ................. 318/568.22 |
| 8,126,593 B2 * | 2/2012 | Watanabe et al. ............. 700/245 |
| 2004/0160208 A1 | 8/2004 | Youm et al. |

(Continued)

FOREIGN PATENT DOCUMENTS

| DE | 198 35 576 A1 | 11/1999 |
| EP | 0 742 637 A1 | 11/1996 |
| EP | 0 974 483 A2 | 1/2000 |
| JP | 2007 037301 | 2/2007 |

OTHER PUBLICATIONS

European Patent Office; Search Report in International Patent Application No. PCT/EP2008/064625 dated Mar. 31, 2009; 6 pages.

*Primary Examiner* — Eduardo Colon Santana
*Assistant Examiner* — Gabriel Agared
(74) *Attorney, Agent, or Firm* — Wood, Herron & Evans, LLP (57) ABSTRACT

The invention relates to an industrial robot having a robotic arm. The robotic arm has several axes (A1-A6) and at least one electric drive, which comprises an electric motor (7-12) and power electronics (16) actuating the electric motor (7-12) and is equipped to move the relevant axis (A1-A6). The industrial robot (1) is equipped to short-circuit the electric motor (7-12) in the event of emergency braking simultaneously by means of two independent electric current paths.

15 Claims, 7 Drawing Sheets

(56) References Cited

U.S. PATENT DOCUMENTS

| | | | |
|---|---|---|---|
| 2004/0222761 A1* | 11/2004 | Jockel | 318/376 |
| 2005/0087034 A1* | 4/2005 | Friedrich et al. | 74/490.03 |
| 2008/0039974 A1* | 2/2008 | Sandin et al. | 700/258 |

* cited by examiner

INDUSTRIAL ROBOT HAVING REDUNDANT EMERGENCY BRAKE CIRCUIT

Industrial robots are manipulating machines, which are equipped with useful tools for automatic handling of objects, and are programmable in a plurality of motion axes, in particular with regard to orientation, position and process sequence. Industrial robots have essentially a robotic arm with a plurality of axes and levers, which are moved by drives. The drives are for example electric drives.

In an emergency situation, for example when a person enters a safety device surrounding the industrial robot, it is necessary to stop the motion of the industrial robot reliably.

The object of the present invention is therefore to specify an industrial robot having at least one electric drive that is equipped to stop the electric motor of the electric drive as safely and reliably as possible under emergency braking.

The problem of the invention is solved by an industrial robot having a robotic arm that has a plurality of axes and at least one electric drive, which has an electric motor and power electronics that actuate the electric motor and are set up to move the relevant axis, the industrial robot being set up to short-circuit the electric motor under emergency braking simultaneously by means of two mutually independent electric current paths.

The industrial robot according to the invention has the robotic arm, which in turn includes a plurality of axes, each of which may be driven by a drive. At least one of these drives is an electric drive. Electric drives have, in a generally known way, an electric motor and power electronics that actuate the electric motor. For the motion of the motor, the power electronics are controlled or regulated for example by a control device of the industrial robot according to the invention.

According to one variant of the industrial robot according to the invention, the electric motor is a three-phase motor, for example a three-phase synchronous or asynchronous chronous motor, and the relevant power electronics have a three-phase inverter that drives the three-phase motor, and a linking circuit which has a link condenser and is connected ahead of the three-phase inverter. The inverter is for example a frequency inverter, which produces a three-phase alternating voltage with adjustable frequency of its fundamental wave from a DC voltage of the linking circuit in a generally known way, for example by means of pulse-width modulation.

A three-phase inverter of this sort has for example a first half-bridge and a second half-bridge, both of which include semiconductor switches controlled by a control device of the industrial robot controller. The semiconductor switches are for example power transistors, for example IGBTs, whose emitter-collectors block or pass paths by means of appropriate actuation of their gates. Semiconductor switches are thus realized through appropriate actuation of the gates of the power transistors. Each of the half-bridges can have one semiconductor switch per phase of the three-phase motor, i.e., a total of three semiconductor switches each. As a rule, the individual semiconductor switches also have suppressor diodes connected parallel to them. By switching the semiconductor switches back and forth, each of the motor connections of the electric motor may be connected optionally to the positive or negative DC voltage of the linking circuit. Thus the frequency of the fundamental wave of the three-phase voltage connected to the motor can be controlled or regulated in a generally known way through appropriate actuation of the semiconductor switches. Thanks to the suppressor diodes, the electric currents in the power lines to the motor can flow in any direction desired.

The DC voltage can be produced for example by means of a rectifier from the AC line voltage, which is smoothed by the link condenser. If the line voltage is three-phase line voltage, then the rectifier is for example a three-phase bridge rectifier.

In an emergency situation, for example when a person approaches dangerously near to the industrial robot, the drives, i.e., also the at least one electric drive or its electric motor, must be brought reliably to a standstill. This is possible with electric motors by short-circuiting them, so that the motor is braked due to the electric current flowing through it. In the case of a three-phase motor, the resulting braking moment is greatest when its three phases are short-circuited; but the motor also brakes if only two phases are short-circuited (or even if only one of the three phases is shorted to ground).

In order to ensure that the electric motor brakes safely and reliably in the emergency situation, i.e., that it is short-circuited safely and reliably, the industrial robot according to the invention is equipped to short-circuit the electric motor under emergency braking simultaneously by means of two mutually independent electric current paths. If one of the two current paths fails partially or completely, then the electric motor is still short-circuited reliably by way of the other current path. Thus the electric motor of the industrial robot according to the invention is braked reliably in the emergency situation by means of two short-circuit braking methods which are independent of each other.

If the electric motor is the three-phase motor, and if the power electronics have the two half-bridges, then according to one embodiment of the industrial robot according to the invention the latter is equipped so that for the emergency braking it blocks the semiconductor switches of the first half-bridge and closes the semiconductor switches of the second half-bridge, so that one of the two electric current paths for the emergency braking runs through the semiconductor switches of the second half-bridge. This type of emergency braking can be carried out in a relatively simple manner.

In addition, the industrial robot according to the invention can be set up for the emergency braking to block the semiconductor switches of the first half-bridge via a first channel and to close the semiconductor switches of the second half-bridge, and to switch off an external electric voltage for the linking circuit via a second channel that differs from the first channel. The external electric voltage is for example the line voltage of the rectifier, i.e., the rectifier is disconnected from the line by switching off the line voltage. However, the external electric voltage can also be switched off for example by disconnecting the rectifier from the linking circuit.

According to one variant of the industrial robot according to the invention, the linking circuit has a first braking resistance and a first switch, the industrial robot according to the invention being set up so as to close the first switch during the emergency braking, in order to connect the braking resistance parallel to the link condenser so that one of the two electric current paths for the emergency braking runs through the first braking resistance. The first switch has for example a first semiconductor switch and/or a first mechanical switch controlled by a first relay. In normal operation of the industrial robot the first switch is open, and the industrial robot closes the first switch only for the short-circuit braking. That causes the link condenser, and thus the electric motor, to be short-circuited through the suppressor diodes. However, the first braking resistance can also be engaged briefly in normal operation, for example if the electric voltage of the link condenser exceeds a maximum permissible electric voltage.

For example, if under emergency braking the electric motor is short-circuited both through the braking resistance of the linking circuit and through the inverter, then the electric current of the motor will flow essentially through the closed semiconductor switches of the second half-bridge. For example, if one or more of the semiconductor switches are defective, or if the actuation of the semiconductor switches is not functioning satisfactorily, then the electric current can flow through the braking resistance of the linking circuit; this ensures reliable emergency braking.

According to one variant, the industrial robot according to the invention may have a second switch, the industrial robot according to the invention being set up to close the second switch during the emergency braking in order to short-circuit the motor directly. However, the industrial robot according to the invention may also have a second braking resistance, the industrial robot according to the invention being equipped to close the second switch during the emergency braking in order to short-circuit the motor directly through the second braking resistance, so that one of the two electric current paths for the emergency braking runs through the second braking resistance. The second switch has for example a second semiconductor switch and/or a second mechanical switch controlled by a second relay. So according to this variant, for the emergency braking the motor windings are short-circuited directly through the second braking resistance, for example in the power line from the power electronics to the motor.

The actuating paths and/or current paths can also be checked and/or tested.

For example, the actuating signals for activating the electric current paths can be passed back to a logic unit and compared to target values.

In normal operation, the potential current paths can be checked, since error-free motor operation is only possible in the event that they are functional.

If the motor is braked for example by means of the second resistance, then the relay of the second switch for example may have an auxiliary contact, on the basis of which for example a signal is produced when the relay is activated. By evaluating this signal, it is then possible to conclude that the second, mechanical switch has closed reliably. Alternatively or additionally, the braking moment of the braking motor can be calculated or measured for example on the basis of the motor current.

The functioning of the inverter can be checked by ascertaining and evaluating the electric current while the motor is still turning. When the inverter is working correctly, in addition no electric current may flow through the suppressor diodes of the first half-bridge. This can be checked for example by ascertaining and evaluating the discharging of the link condenser through the first braking resistance with the voltage for the linking circuit switched off. If the discharge corresponds to the self-discharge curve that results from the ohmic resistance of the first braking resistance and the capacitance of the link condenser, then there is no electric current flowing through the suppressor diodes of the first half-bridge.

The braking moment of the motor can also be measured or calculated while the motor is still turning.

The linking circuit can also be checked with the motor stopped, for example by measuring and evaluating the electric voltage of the link condenser. After the first braking resistance is brought into the circuit, the electric voltage must drop depending on the capacitance of the link condenser and on the ohmic resistance of the first braking resistance and any energy fed back from the turning motor. It is also possible to ascertain and evaluate the electric current through the first braking resistance, or to ascertain and analyze the braking moment while the motor is still turning.

Examples of exemplary embodiments of the invention are depicted in the attached schematic drawings. The figures show the following.

Figure 1:
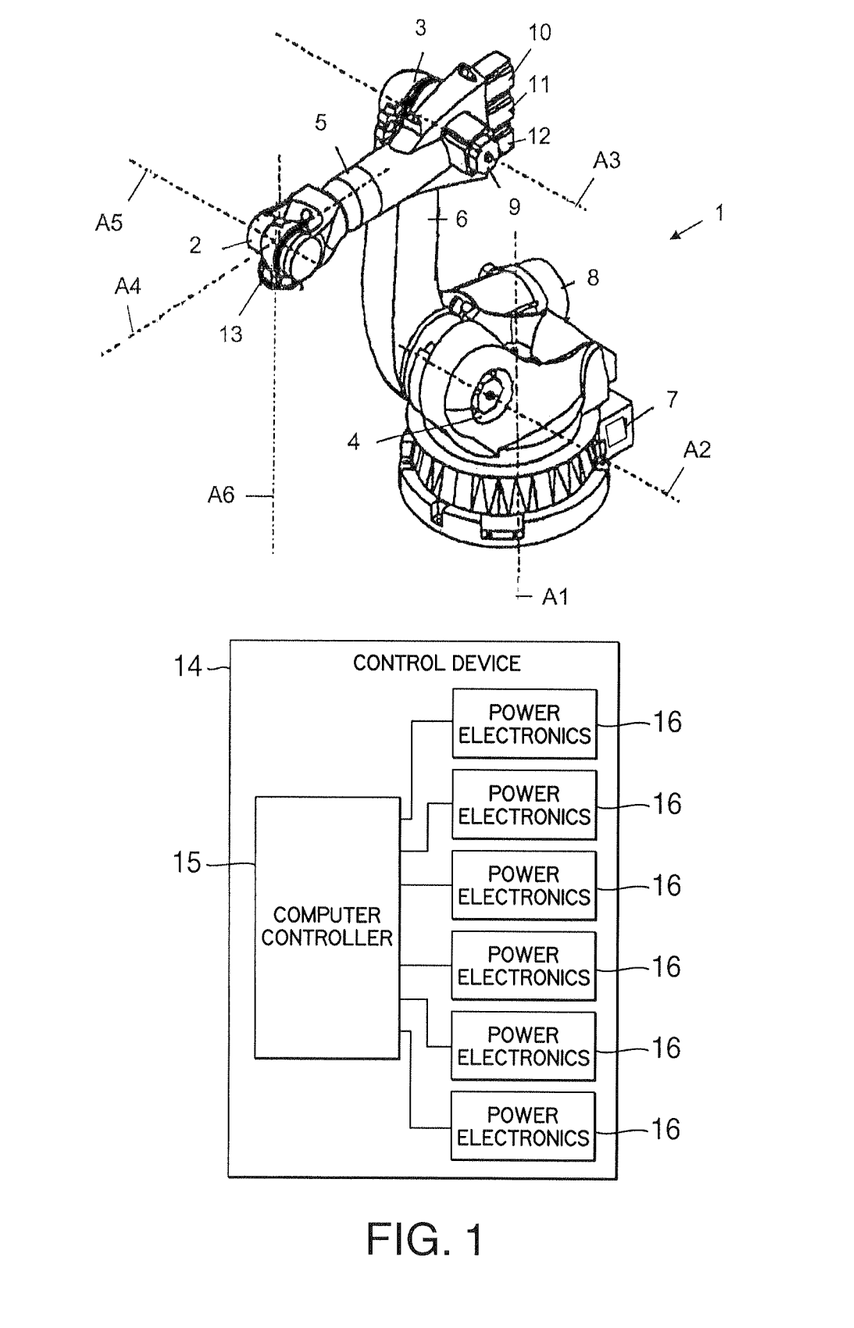
FIG. 1 an industrial robot.

FIG. 1 shows an industrial robot 1 with kinematics for movements in six degrees of freedom. Industrial robot 1 has, in a generally known way, joints 2 through 5, levers 6, six axes of motion A1 through A6 and a flange 13.

Each of the axes A1-A6 is moved by a drive, which in the case of the present exemplary embodiment are electric drives and each of which has an electric motor 7-12. Motor 7 moves axis AI, motor 8 moves axis A2, motor 9 moves axis A3 and motors 10-12 move axes A4-A6, through gears that are not depicted in greater detail in FIG. 1, but are generally known to the person skilled in the art.

In the case of the present exemplary embodiment, electric motors 7-12 are three-phase AC motors, in particular synchronous motors. Motors 7-12 are each actuated by power electronics units 16, which in the case of the present exemplary embodiment are situated in a control device 14. The power electronics units 16 are each connected electrically to their electric motors 7-12 in a manner not shown. One of the power electronics units 16 is shown in the form of a block diagram for motor 10 in FIG. 2, by way of example.

The electric drives or power electronics 16 of electric motors 7-12 are connected to a control computer 15, on which an appropriate program is running that is known in principle to the person skilled in the art, which actuates the power electronics 16 in an appropriate and generally known manner, so that industrial robot 1 moves as desired. Control computer 15 in the case of the present exemplary embodiment is situated with the power electronics 16 in the housing of control device 14.

Figure 3:
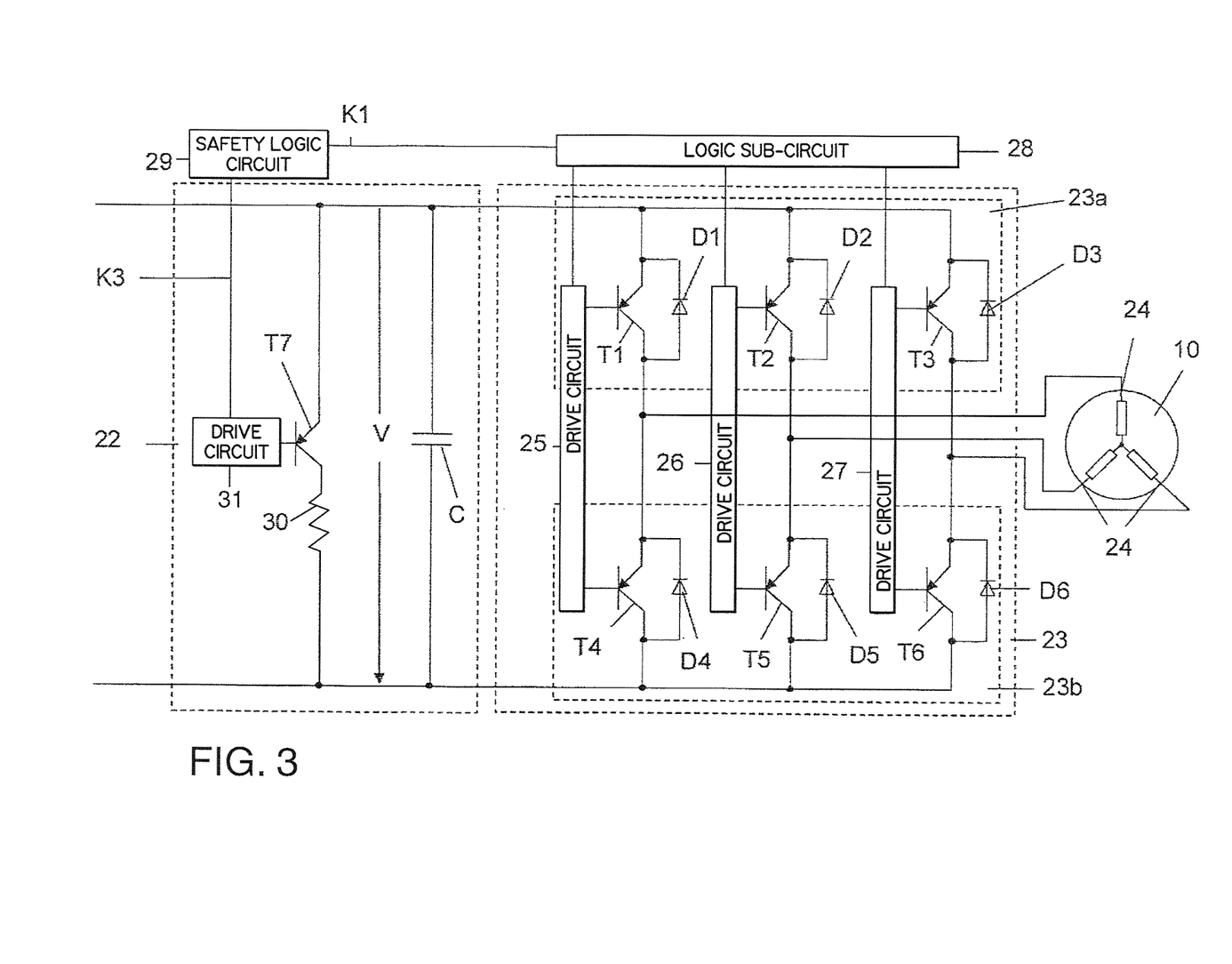

In the case of the present exemplary embodiment, each of the power electronics units 16 for the electric motors 7-12 includes a rectifier 21, a linking circuit 22 and an inverter 23. FIG. 3 shows linking circuit 22 and inverter 23 in a more exact depiction.

Linking circuit 22 has a condenser C, and rectifier 21 produces from the three-phase line voltage, in a generally known way, a DC voltage V smoothed by condenser C of linking circuit 22. The smoothed DC voltage V is the input voltage of inverter 23, which produces from the DC voltage V, in a generally known way, a three-phase voltage whose fundamental wave is frequency-adjustable. The three-phase voltage is fed to motor terminals 24 of motor 10, and is produced for example by means of pulse-width modulation (PWM).

In the case of the present exemplary embodiment, inverter 23 has a first half-bridge 23a and a second half-bridge 23b, each of which has three semiconductor switches with associated suppressor diodes D1-D6. The semiconductor switches in the case of the present exemplary embodiment are power transistors T1-T6, which are for example IGBTs. The power transistors of first half-bridge 23a and the associated suppressor diodes are identified with the reference labels T1-T3 and D1-D3, respectively, and the power transistors of second half-bridge 23b and the associated suppressor diodes are identified with the reference labels T4-T6 and D4-D6, respectively.

In generally known ways, the emitters of power transistors T1-T3 of first half-bridge 23a are electrically connected to one of the terminals of condenser C, and the collectors of power transistors T1-T3 of first half-bridge 23a are electrically connected to the motor terminals 24 of electric motor 10. The collectors of power transistors T4-T6 of second half-bridge 23b are electrically connected to the other terminal of condenser C, and the emitters of power transistors T4-T6 of second half-bridge 23b are electrically connected to the motor terminals 24 of electric motor 10.

The gates of power transistors T1-T6 are connected to drive circuits 25-27, which switch the power transistors T1-T6, which are in the form of semiconductor switches, on and off in a generally known way, so that each of the motor terminals 24 of motor 10 is optionally connected to the positive or the negative DC voltage V of linking circuit 22. Thus the frequency of the fundamental wave of the three-phase voltage connected to the motor can be controlled or regulated in a generally known way through appropriate actuation of the power transistors T1-T6.

In the case of the present exemplary embodiment, drive circuits 25-27 are actuated by a first logic sub-circuit 28 which in turn is connected to a safety logic circuit 29. Safety logic circuit 29 is connected in a manner not shown to control computer 15, or is part of control computer 15.

Figure 4:
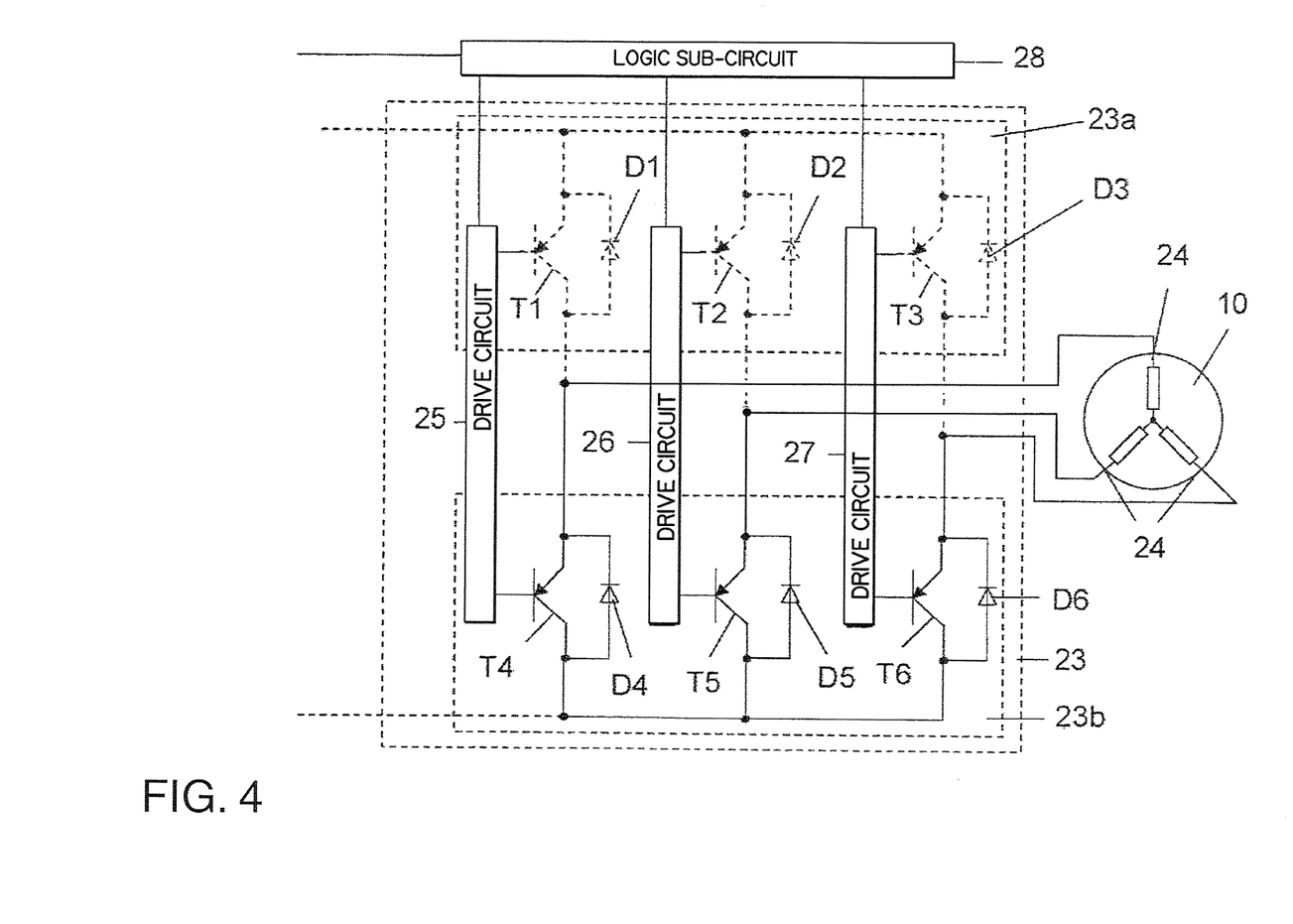

When industrial robot 1 is in operation, it can occur that motors 7-12 have to be braked reliably. This is accomplished in the case of the present exemplary embodiment by safety logic circuit 29 feeding a signal via a first channel K1 to logic sub-circuit 28, so that the latter actuates drive circuits 25-27 in such a way that power transistors T1-T3 of first half-bridge 23a are switched off (blocked) and power transistors T4-T6 of second half-bridge 23b are switched on. That causes the stator windings of motor 10 to be short-circuited through power transistors T4-T6 of second half-bridge 23b. This is indicated in FIG. 4 by depicting the components of first half-bridge 23a with dashed lines and the components of second half-bridge 23b with solid lines. The electric current produced by motor 10 during the braking flows through power transistors T4-T6.

Figure 2:
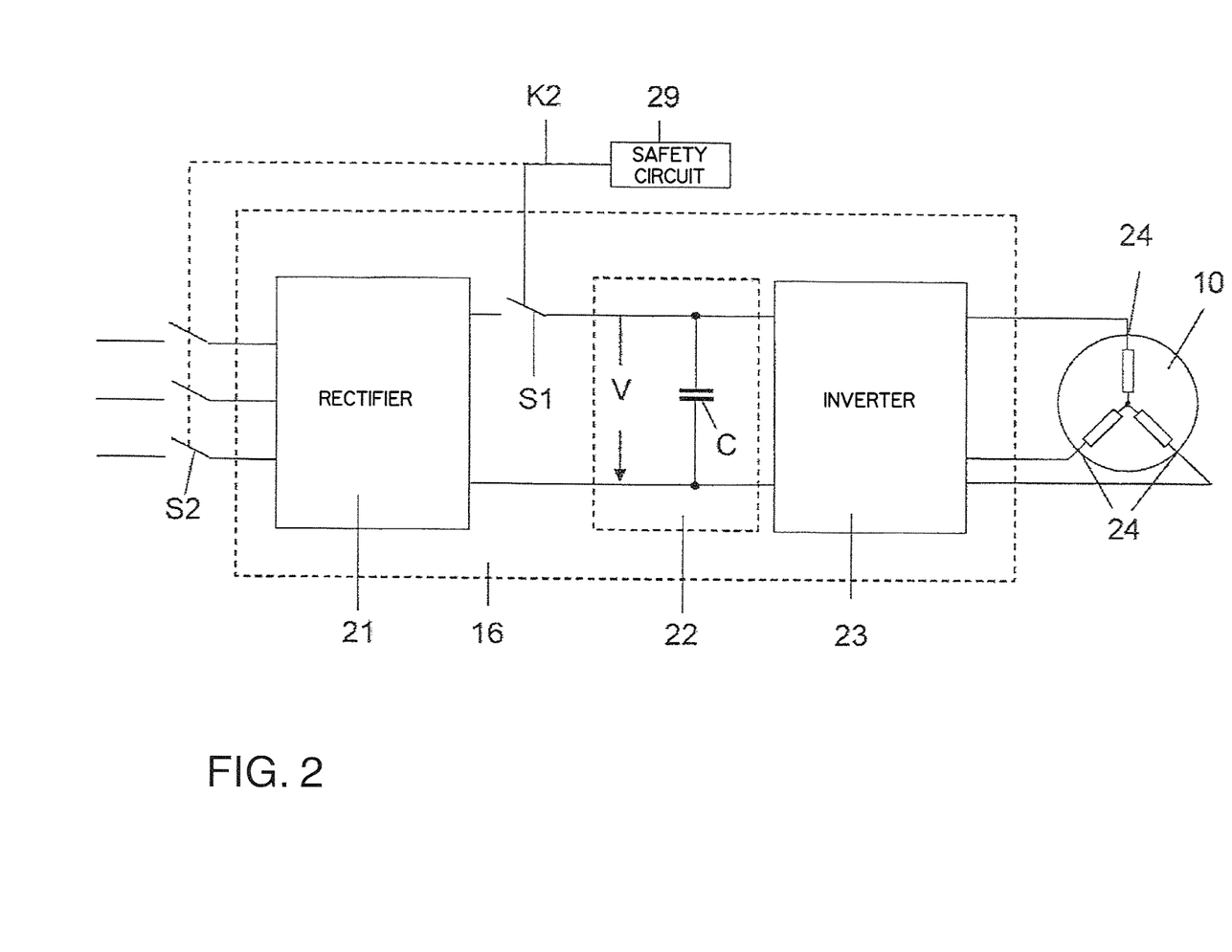
FIG. 2 an electric drive of the industrial robot, depicted in the form of a block diagram, FIG. 3 a detailed depiction of a part of the electric drive, FIGS. 4 and 5 depictions of the partial depiction of the electric drive, illustrating operating states, FIG. 6 a linking circuit of a power electronics unit, and FIG. 7 a circuit suitable for braking a motor.

At the same time, safety logic switch 29 sends a signal via a second channel K2, which is independent of the first channel K2, to a switch S1 shown in FIG. 2, which separates rectifier 21 from linking circuit 22. Alternatively or in addition, rectifier 21 can be separated from the line voltage via channel K2 by means of a three-phase switch S2.

In order to ensure that motor 10 is braked reliably and safely by means of short-circuit braking, even if for example components of inverter 23 and/or one or more drive circuits 25-27 are defective, the electric drives of industrial robot 1 each have a second option for braking their motors 7-12 by means of short-circuit braking.

In the case of the present exemplary embodiment, the second option for braking motor 10 is made possible by means of a braking resistance 30 of linking circuit 22, which can be switched parallel to condenser C by means of a power transistor T7 in the form of a semiconductor switch. Power transistor T7 is for example likewise an IGBT, and is switched on and off by means of a drive circuit 31, which is connected to safety logic circuit 29.

Figure 5:
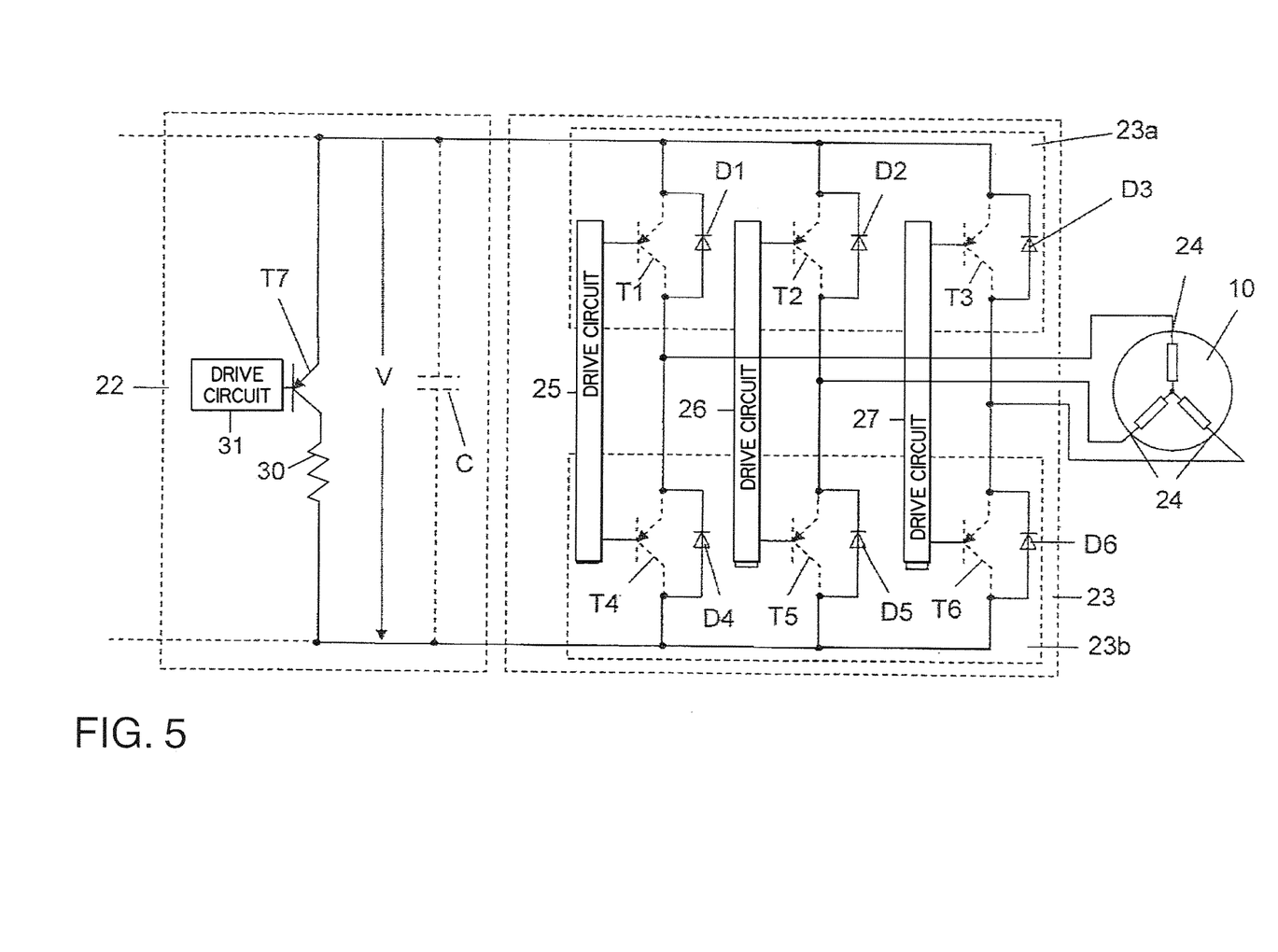

When industrial robot 1 is in operation, power transistor T2 is switched off. For reliable short-circuit braking, safety logic circuit 29 not only sends a signal via the first channel K1 to logic sub-circuit 28 in order to brake motor 10 by means of inverter 23 as explained above, but also sends a signal via a third channel K3 which is independent of the first and second channels K1, K2 to drive circuit 31, in order to close power transistor T7 of linking circuit 22, so that condenser C is short-circuited through braking resistance 30. Thus motor 10 is also short-circuited through braking resistance 30. This is indicated in FIG. 5, in which components through which an electric current produced by motor 10 during the braking flows are depicted with solid lines. In the depiction shown in FIG. 5, it is assumed that all power transistors T1-T6 are blocking, so that the electric current flows through suppressor diodes D1-D6 during the braking of motor 10. If inverter 23 is working correctly during the short-circuit braking, then the electric current produced by motor 10 flows through power transistors T4-T6 of second half-bridge 23b.

This ensures that motor 10 is braked reliably, even if one of the two braking options fails.

Figure 6:
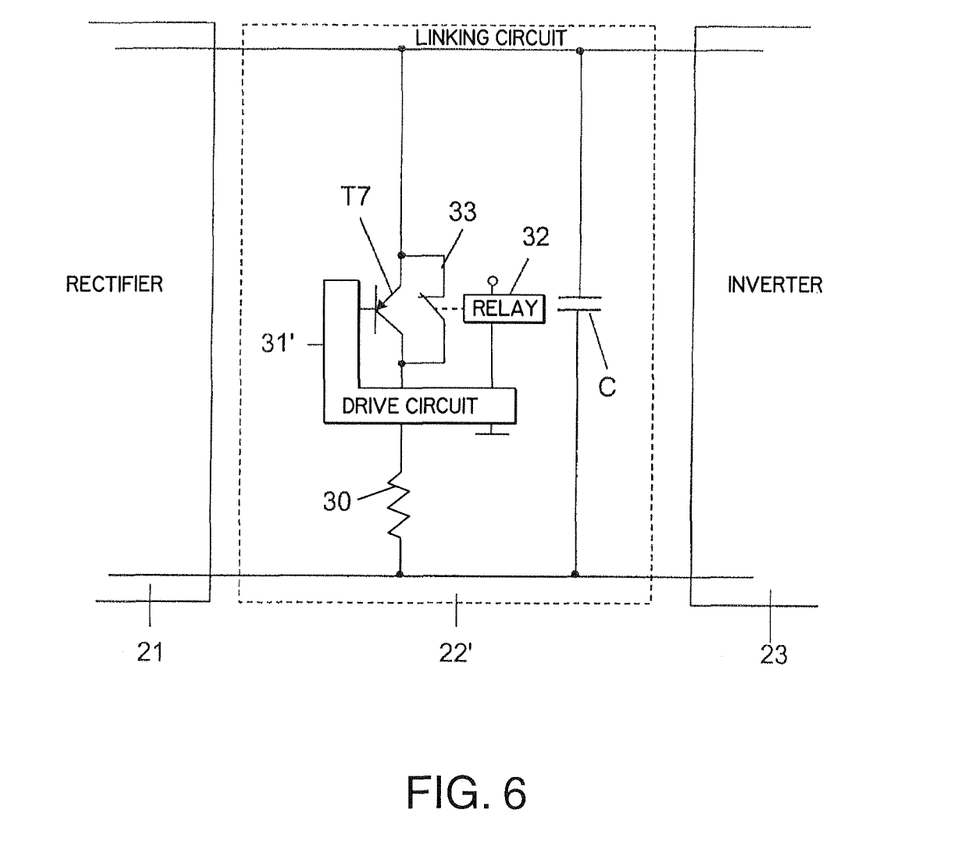

FIG. 6 shows an alternative linking circuit 22' that can be used for the inverter 23 instead of the linking circuit 22 shown in FIGS. 3 and 5. The linking circuit 22' shown in FIG. 6 differs essentially in having an additional relay 32 and a mechanical switch 33 that is switchable by means of relay 32, connected parallel to power transistor T7 of linking circuit 22'. Instead of a drive circuit 31, linking circuit 22' has a drive circuit 31', that controls not only power transistor T7 but also relay 32.

In normal operation of industrial robot 1, mechanical switch 33 and power transistor T7 of linking circuit 22' are open. For reliable short-circuit braking, safety logic circuit 29 sends a signal via the third channel K3 to drive circuit 31', so that the latter both closes power switch T7 and causes relay 32 to close mechanical switch 33. Thus the braking resistance 30 is switched parallel to condenser C not only through power switch T7, but also through mechanical switch 33. Alternatively, it is also possible that linking circuit 22' does not included a power transistor T7, but is only able to bring braking resistance 30 online through mechanical switch 33.

Figure 7:
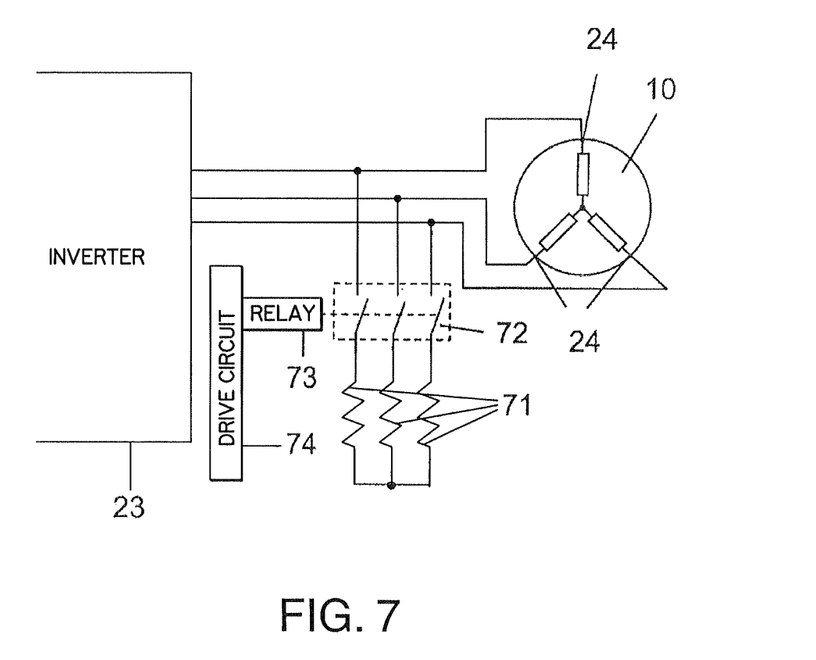

FIG. 7 shows an additional possibility for braking motor 10. In the case of the exemplary embodiment depicted in FIG. 7, motor 7 can be short-circuited through a switch by means of three resistances 71 connected in a star pattern. The switch can be realized for example as a semiconductor switch in the form of a power transistor, for example an IGBT, or, as shown in FIG. 7, by a mechanical switch 72 which is controlled for example by means of a relay 73. In normal operation of industrial robot 1, switch 72 is open. For reliable braking, safety logic circuit 29 sends a signal to a drive circuit 74, which as a result activates relay 73 so that the latter closes switch 71. That short-circuits and brakes motor 10. This option for braking motor 10 is used for reliable braking, parallel to braking by means of inverter 23, as described above. It is also possible however to short-circuit motor 10 for braking directly, without the resistances 71. Then a three-phase mechanical switch is not needed, but rather all three phases of motor 10 can be short-circuited with two switches.

Alternatively, it is also possible in addition for motor 10 to be braked by means of braking resistances 30 and the resistances 71.

It is also possible, however, that for reliable braking motor 10 is braked by means of braking resistance 30, resistances 71 and inverter 23.

In addition, there can be provision in the present exemplary embodiments for checking the components that are provided for braking the motors 7-12.

If motor 10 is braked for example by means of resistances 71, then relay 73 for example may have an auxiliary contact, on the basis of which for example a signal is produced when the relay is activated. By evaluating this signal, it is then possible to conclude that switch 72 has closed reliably. Alternatively or additionally, the braking moment of the braking motor 10 can be calculated or measured for example on the basis of the motor current.

The functioning of inverter 23 can be checked by ascertaining and evaluating the electric current of motor 10 while the motor is still turning. When inverter 10 [Translator's note: this reference label should probably be 23] is working correctly, in addition no electric current may flow through suppressor diodes D1-D3 of first half-bridge 23*a*. This can be checked for example by ascertaining and evaluating the discharging of condenser C through braking resistance 30 with rectifier 21 switched off. If the discharge corresponds to the self-discharge curve that results from the ohmic resistance of the braking resistance and the capacitance of condenser C, then there is no electric current flowing through suppressor diodes D1-D4 of the first half-bridge.

The braking moment of motor 10 can also be measured or calculated while motor 10 is still turning.

Linking circuit 22 can also be checked with motor 10 stopped, for example by measuring and evaluating the electric voltage of the condenser C. After braking resistance 30 is brought into the circuit, the electric voltage must drop depending on the capacitance of the link condenser and on the ohmic resistance of the braking resistance and any energy fed back from the turning motor 10. It is also possible to ascertain and evaluate the electric current through the braking resistance, or to ascertain and analyze the braking moment while motor 10 is still turning.

The invention claimed is:

1. An industrial robot comprising:
   a robotic arm movable about at least one axis;
   an electric motor having an input and coupled to the robotic arm so that movement of the electric motor causes movement of the robotic arm about the at least one axis;
   power electronics electrically coupled to the electric motor input and actuating the electric motor for movement of the robotic arm about the axis;
   at least two independent current paths, wherein each of the at least two independent current paths is configured so that when the current path is electrically coupled to the electric motor input, the electric motor input is shorted through the independent current path, causing the electric motor to brake; and
   a controller electrically coupling two or more of the at least two independent current paths to the electric motor input in response to emergency braking conditions, thereby causing emergency braking of the electric motor, wherein
   one of the at least two independent current paths comprises a first switch connected directly to the input of the electric motor; and
   the controller electrically couples one of the at least two independent current paths to the motor, in response to emergency braking conditions, by causing the first switch to enter a closed state, thereby shorting the motor input.

2. The industrial robot of claim 1, wherein:
   one of the at least two independent current paths comprises a second switch in series with a resistance;
   the second switch is connected directly to the input of the electric motor; and
   the controller electrically couples one of the at least two independent current paths to the motor, in response to emergency braking conditions, by causing the second switch to enter a closed state, thereby shorting the motor input through the resistance.

3. The industrial robot of claim 1, wherein the electric motor is a three-phase motor, and wherein the power electronics comprise:
   a three-phase inverter having an input and an output; and
   a linking circuit comprising a capacitor;
   wherein the linking circuit is electrically coupled to the three-phase inverter input, and the three-phase inverter output is electrically coupled to the electric motor input.

4. The industrial robot of claim 3, wherein the linking circuit further comprises:
   a first resistance, and
   a second switch in series with the first resistance and operatively coupled to the controller;
   wherein the controller, in response to emergency braking conditions, couples one of the at least two independent current paths to the electric motor input by causing the second switch to enter a closed state; and
   wherein the closed state of the second switch places the first resistance in parallel with the capacitor, thereby discharging the capacitor through the first resistance, and shorting the electric motor input through a path including the first resistance.

5. The industrial robot of claim 4, wherein the three-phase inverter comprises:
   a first half-bridge including a first plurality of semiconductor switches; and
   a second half-bridge including a second plurality of semiconductor switches;
   wherein the controller is operatively coupled to the first plurality of semiconductor switches and the second plurality of semiconductor switches; and
   wherein the controller, in response to emergency braking conditions, couples one of the at least two independent current paths to the electric motor input by causing the first plurality of semiconductor switches to enter an open state, and causing the second plurality of semiconductor switches to enter a closed state.

6. An industrial robot comprising:
   a robotic arm movable about at least one axis;
   an electric motor having an input and coupled to the robotic arm so that movement of the electric motor causes movement of the robotic arm about the at least one axis;
   an inverter having an input and an output, the output electrically coupled to the electric motor input;
   a linking circuit electrically coupled to the inverter input, the linking circuit having a capacitor, a first resistance, a first switch in series with the first resistance, and a second switch in parallel with the first switch;
   at least two independent current paths each configured so that when the current path is electrically coupled to the electric motor input, the electric motor input is shorted through the current path, causing the electric motor to brake; and
   a controller operatively coupled to the first and second switches, the controller electrically coupling two or more of the at least two independent current paths to the electric motor input in response to emergency braking conditions, thereby causing emergency braking of the electric motor,
   wherein the controller couples one of the at least two independent current paths to the electric motor input by causing at least one of the first and second switches to enter a closed state, the closed state of either of the first and the second switches placing the first resistance in parallel with the capacitor, thereby discharging the capacitor through the first resistance and shorting the electric motor input through a path including the first resistance.

7. The industrial robot of claim 6, wherein the first switch is a semiconductor switch, and the second switch is a mechanical switch actuated by a relay.

8. An industrial robot comprising:
a robotic arm movable about at least one axis;
an electric motor having an input and coupled to the robotic arm so that movement of the electric motor causes movement of the robotic arm about the at least one axis;
a controller;
a voltage source;
an inverter including an input, an output electrically coupled to the electric motor input, a first half-bridge having a first plurality of semiconductor switches, and a second half-bridge having a second plurality of semiconductor switches;
a linking circuit electrically coupling the voltage source to the inverter input, the linking circuit including a capacitor, a first resistance, and a first switch in series with the first resistance, the first switch being operatively coupled to the controller;
a second switch adapted to disconnect the linking circuit and inverter from the voltage source when the second switch is in an open state;
a first channel operatively coupling the controller to the first and second plurality of semiconductor switches;
a second channel, independent of the first channel, that operatively couples the controller to the second switch; and
at least two independent current paths, wherein each of the at least two independent current paths is configured so that when the current path is coupled to the electric motor input, the electric motor input is shorted through the current path, causing the electric motor to brake,
wherein the controller, in response to emergency braking conditions, brakes the motor by:
causing the second switch to go into an open state,
coupling one of the at least two independent current paths to the electric motor input by causing the first switch to enter a closed state so that the first resistance is placed in parallel with the capacitor to discharge the capacitor and short the electric motor input through a path including the first resistance, and
coupling another path of the at least two independent current paths to the electric motor input by causing the first plurality of semiconductor switches to enter an open state and the second plurality of semiconductor switches to enter a closed state.

9. The industrial robot of claim 8, wherein the linking circuit further comprises:
a third switch in parallel with the first switch and operatively coupled to the controller;
wherein the controller, in response to emergency braking conditions, couples one of the at least two independent current paths to the electric motor input by causing the third switch to enter a closed state; and
wherein the closed state of the third switch places the first resistance in parallel with the capacitor, thereby discharging the capacitor through the first resistance, and shorting the electric motor input through a path including the first resistance.

10. The industrial robot of claim 9, wherein:
one of the at least two independent current paths comprises a fourth switch connected directly to the input of the electric motor; and
the controller electrically couples one of the at least two independent current paths to the motor, in response to emergency braking conditions, by causing the fourth switch to enter a closed state, thereby shorting the motor input.

11. The industrial robot of claim 9, wherein:
one of the at least two independent current paths comprises a fourth switch in series with a second resistance;
the fourth switch is connected directly to the input of the electric motor; and
the controller electrically couples one of the at least two independent current paths to the motor, in response to emergency braking conditions, by causing the fourth switch to enter a closed state, thereby shorting the motor input through the second resistance.

12. An industrial robot comprising:
a robotic arm movable about at least one axis;
a three-phase electric motor having an input and coupled to the robotic arm so that movement of the electric motor causes movement of the robotic arm about the at least one axis;
a three-phase inverter having an input and an output;
the inverter comprising a first half-bridge including a first plurality of semiconductor switches, and a second half-bridge including a second plurality of semiconductor switches;
a linking circuit comprising a capacitor, a first resistance, and a first switch in series with the first resistance;
a voltage source electrically coupled to the linking circuit and the inverter;
a second switch adapted to disconnect the linking circuit and inverter from the voltage source when the second switch is in an open state; and
a controller operatively coupled to the first switch, the second switch, the first plurality of semiconductor switches, and the second plurality of semiconductor switches;
wherein the controller, in response to emergency braking conditions, brakes the electric motor by:
causing the first plurality of semiconductor switches to enter an open state and the second plurality of semiconductor switches to enter a closed state, thereby providing a first current path shorting the input of the electric motor,
causing the first switch to enter a closed state, shorting the electric motor input through a path including the first resistance, thereby providing a second current path shorting the input of the electric motor, and
causing the second switch to enter an open state, thereby disconnecting the voltage source from the linking circuit and inverter input.

13. The industrial robot of claim 12, wherein:
the controller is operatively coupled to the first and second plurality of semiconductor switches by a first channel; and
wherein the controller is operatively coupled to the second switch by a second channel independent of the first channel.

14. The industrial robot of claim 12, wherein the linking circuit further comprises:
a third switch in parallel with the first switch and operatively coupled to the controller;
wherein the controller, in response to emergency braking conditions, causes the third switch to enter a closed state, thereby shorting the electric motor input through a path including the first resistance.

15. The industrial robot of claim 12, further comprising:
a fourth switch in series with a second resistance;
wherein the fourth switch is connected directly to the input of the electric motor; and
the controller, in response to emergency braking conditions, causes the fourth switch to enter a closed state, thereby shorting the motor input through the second resistance.

\* \* \* \* \*